(12) United States Patent
Yamauchi et al.

(10) Patent No.: US 9,910,225 B2
(45) Date of Patent: Mar. 6, 2018

(54) OPTICAL RECEPTACLE RELAXING MECHANICAL STRESS INDUCED BY WELDING AND OPTICAL MODULE IMPLEMENTING THE SAME

(71) Applicant: Sumitomo Electric Device Innovations, Inc., Yokohama-shi (JP)

(72) Inventors: Yasuyuki Yamauchi, Yokohama (JP); Tsutomu Abe, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 0 days.

(21) Appl. No.: 15/317,051

(22) PCT Filed: May 27, 2016

(86) PCT No.: PCT/JP2016/002599
§ 371 (c)(1),
(2) Date: Dec. 7, 2016

(87) PCT Pub. No.: WO2016/189882
PCT Pub. Date: Dec. 1, 2016

(65) Prior Publication Data
US 2017/0139153 A1    May 18, 2017

(30) Foreign Application Priority Data
May 28, 2015  (JP) ................. 2015-108899

(51) Int. Cl.
*G02B 6/38* (2006.01)
*G02B 6/42* (2006.01)
(Continued)

(52) U.S. Cl.
CPC ........... *G02B 6/3846* (2013.01); *G02B 6/024* (2013.01); *G02B 6/32* (2013.01); *G02B 6/3874* (2013.01);
(Continued)

(58) Field of Classification Search
CPC .. G02B 6/3874; G02B 6/3846; G02B 6/4292; G02B 6/421
See application file for complete search history.

(56) References Cited

U.S. PATENT DOCUMENTS

| 6,538,901 B1 | 3/2003 | Hung |
| 2004/0022500 A1 | 2/2004 | Owen et al. |

(Continued)

FOREIGN PATENT DOCUMENTS

| CN | 101526653 A | 9/2009 |
| JP | 05-011149 A | 1/1993 |

(Continued)

OTHER PUBLICATIONS

International Search Report and Written Opinion in counterpart International Application No. PCT/JP2016/002599, dated Aug. 30, 2016.

*Primary Examiner* — Jerry Rahll
(74) *Attorney, Agent, or Firm* — Venable LLP; Michael A. Sartori; Miguel A. Lopez

(57) ABSTRACT

An optical receptacle and an optical module that implements the optical receptacle are disclosed. The optical receptacle provides a stub holding a coupling fiber in a center thereof, a bush press-fitting the stub therein, a sleeve, and a metal cover that is to be welded to an external metallic member. The coupling fiber has a type of polarization maintaining fiber. The bush is inserted into the cover as leaving a gap between the cover and the bush. The gap between the cover and the bush effectively relaxes or absorbs stresses induced during the welding caused in the coupling fiber.

18 Claims, 9 Drawing Sheets

(51) Int. Cl.
*G02B 6/024* (2006.01)
*G02B 6/32* (2006.01)

(52) U.S. Cl.
CPC ........... *G02B 6/421* (2013.01); *G02B 6/4201* (2013.01); *G02B 6/4292* (2013.01)

(56) References Cited

U.S. PATENT DOCUMENTS

| | | | |
|---|---|---|---|
| 2009/0226136 A1* | 9/2009 | Shimizu | G02B 6/4292 385/60 |
| 2009/0274421 A1 | 11/2009 | Arayama et al. | |
| 2011/0075887 A1 | 3/2011 | Tanaka | |
| 2015/0346437 A1 | 12/2015 | Yamamoto et al. | |
| 2015/0378107 A1 | 12/2015 | Akashi et al. | |

FOREIGN PATENT DOCUMENTS

| | | |
|---|---|---|
| JP | 08-334654 A | 12/1996 |
| JP | 2006-184338 A | 7/2006 |
| JP | 2008-058936 A | 3/2008 |
| JP | 2008-165003 A | 7/2008 |
| JP | 2009-192566 A | 8/2009 |
| WO | 2013/125084 A1 | 8/2013 |
| WO | 2015/012183 A1 | 1/2015 |

* cited by examiner

[Fig. 1]
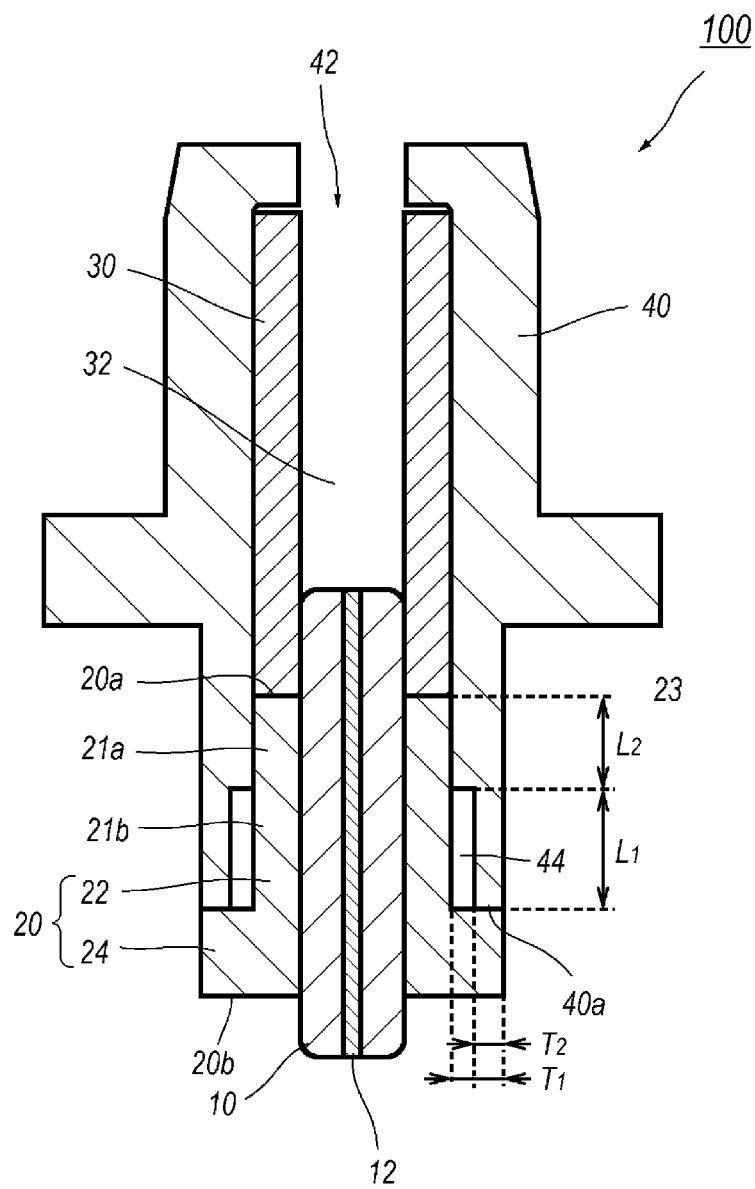

[Fig. 2]
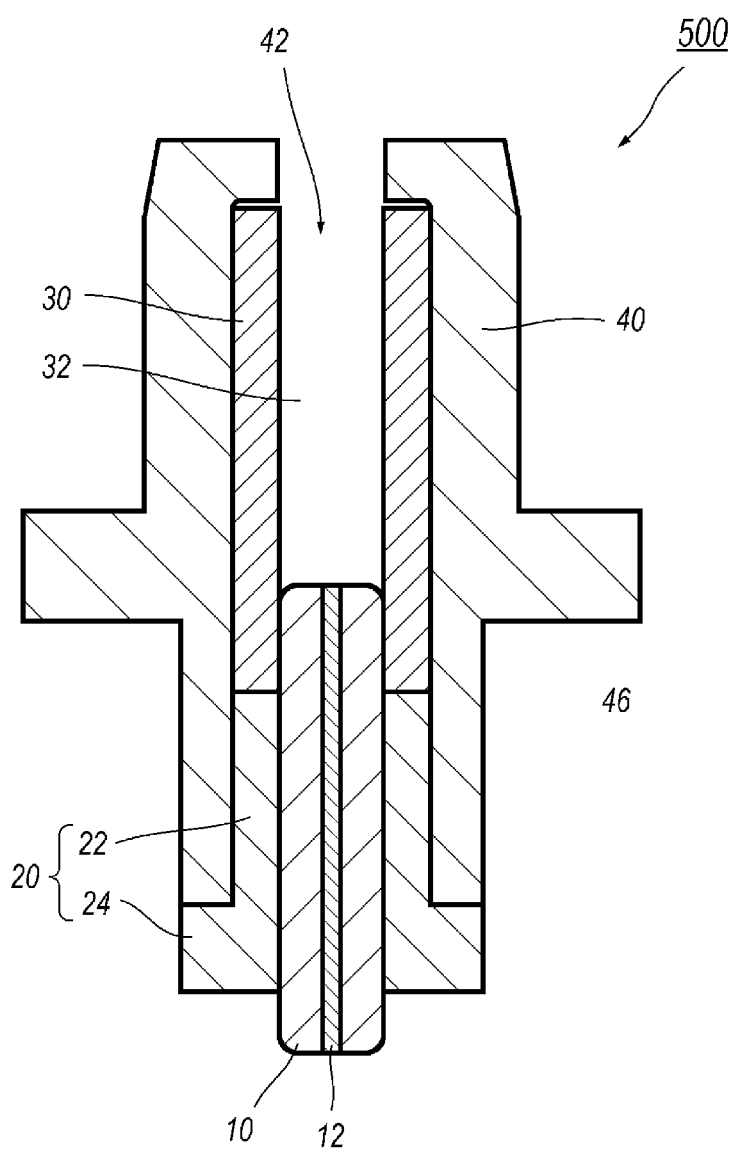

[Fig. 3]
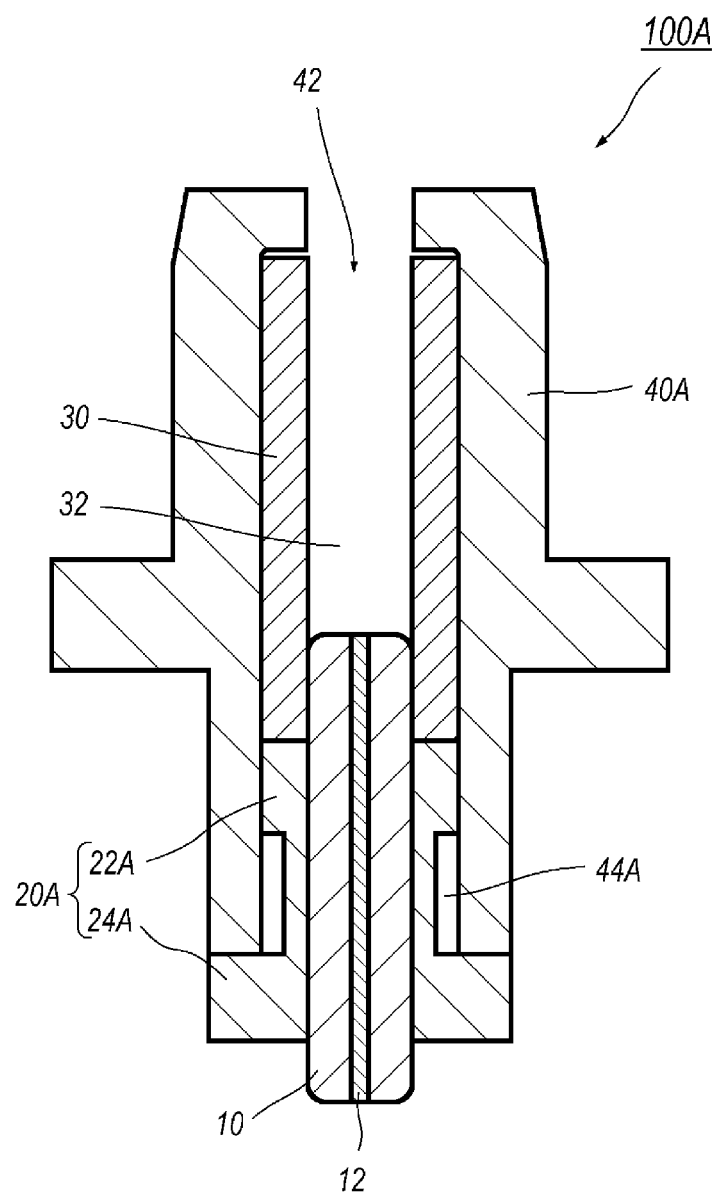

[Fig. 4]
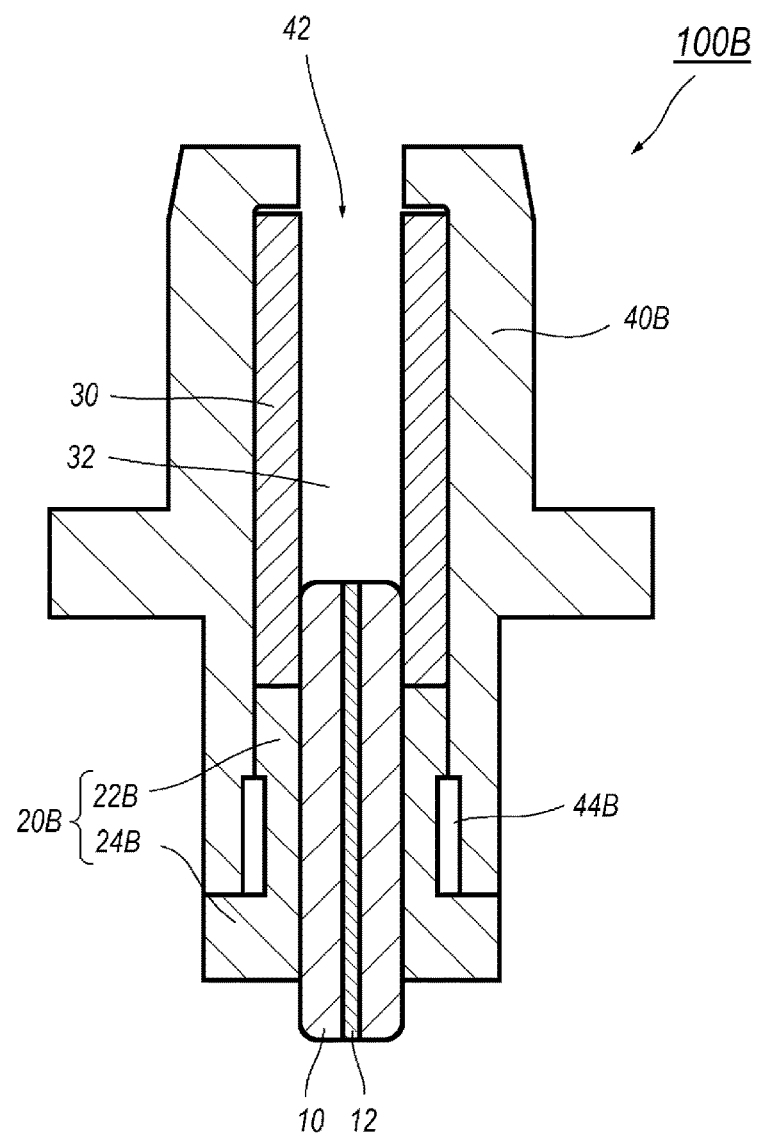

[Fig. 5]
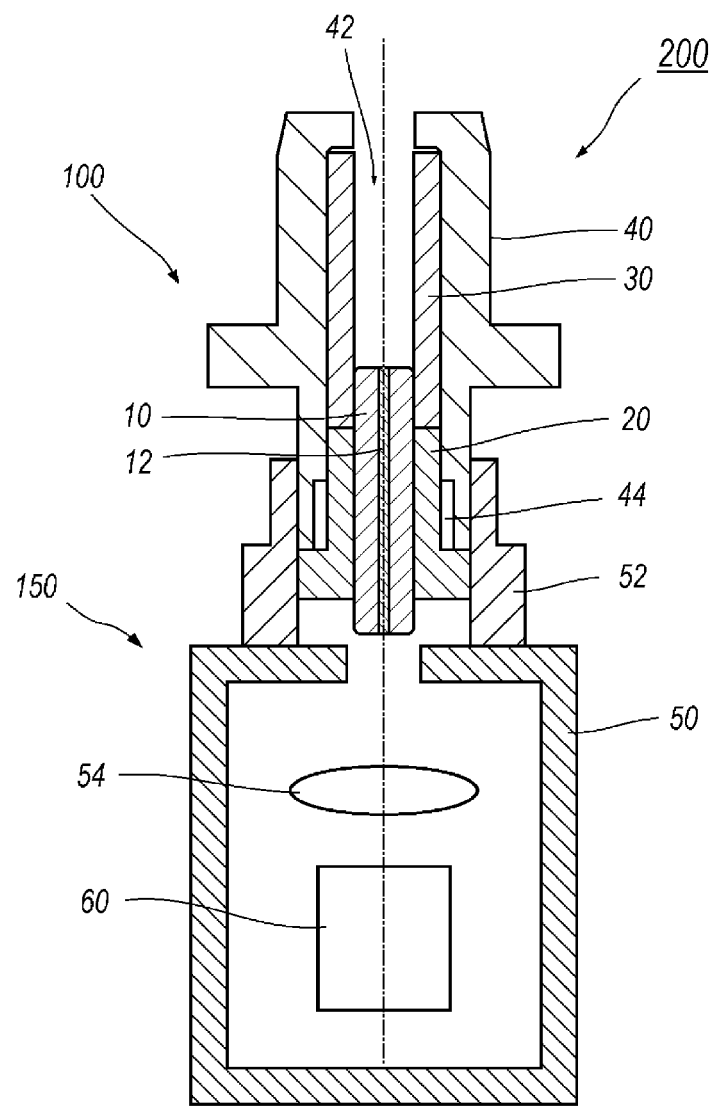

[Fig. 6]
(A)
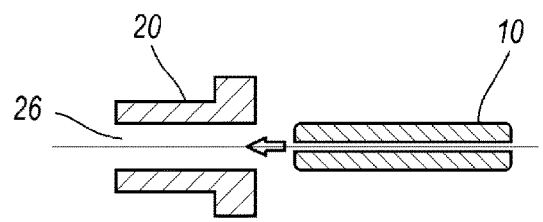
(B)
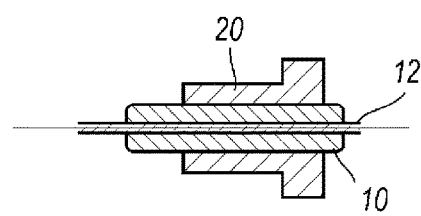
(C)
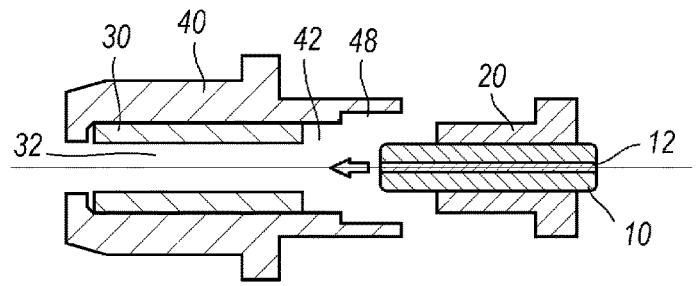
(D)
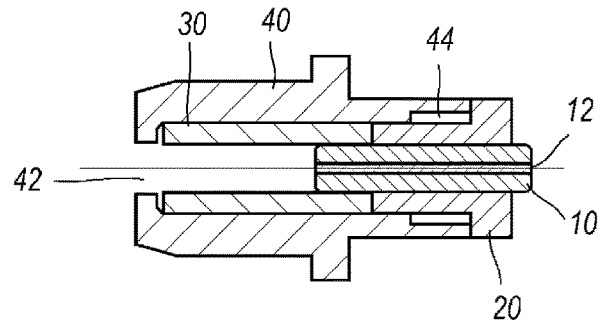

[Fig. 7]
(A)
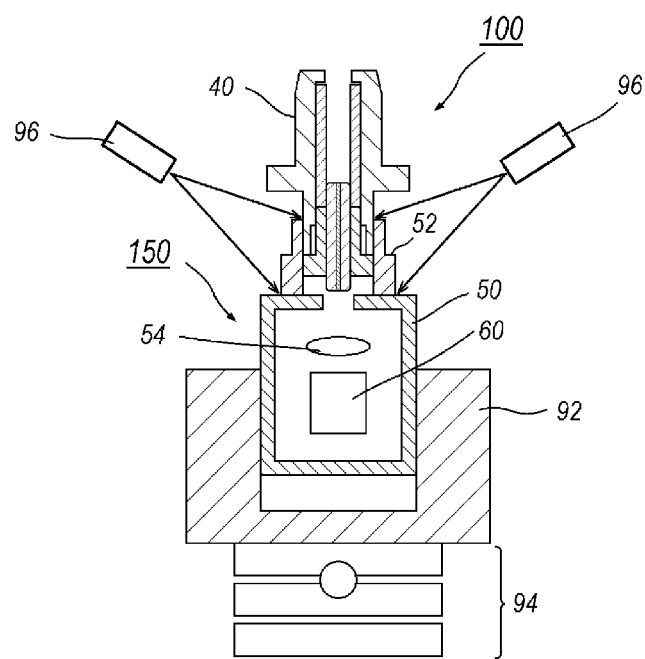
(B)
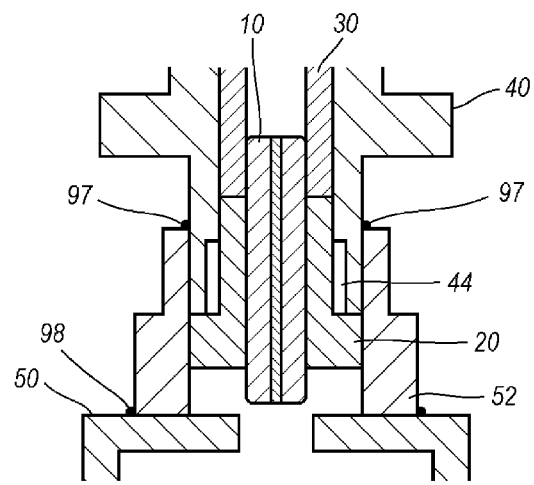

[Fig. 8]
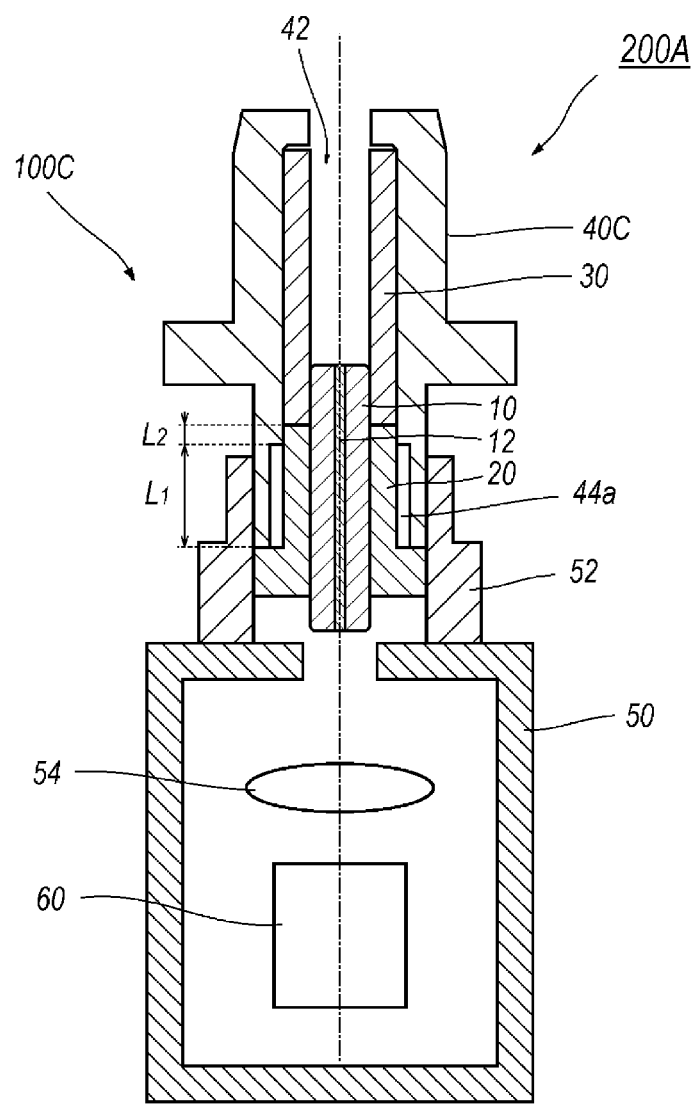

[Fig. 9]
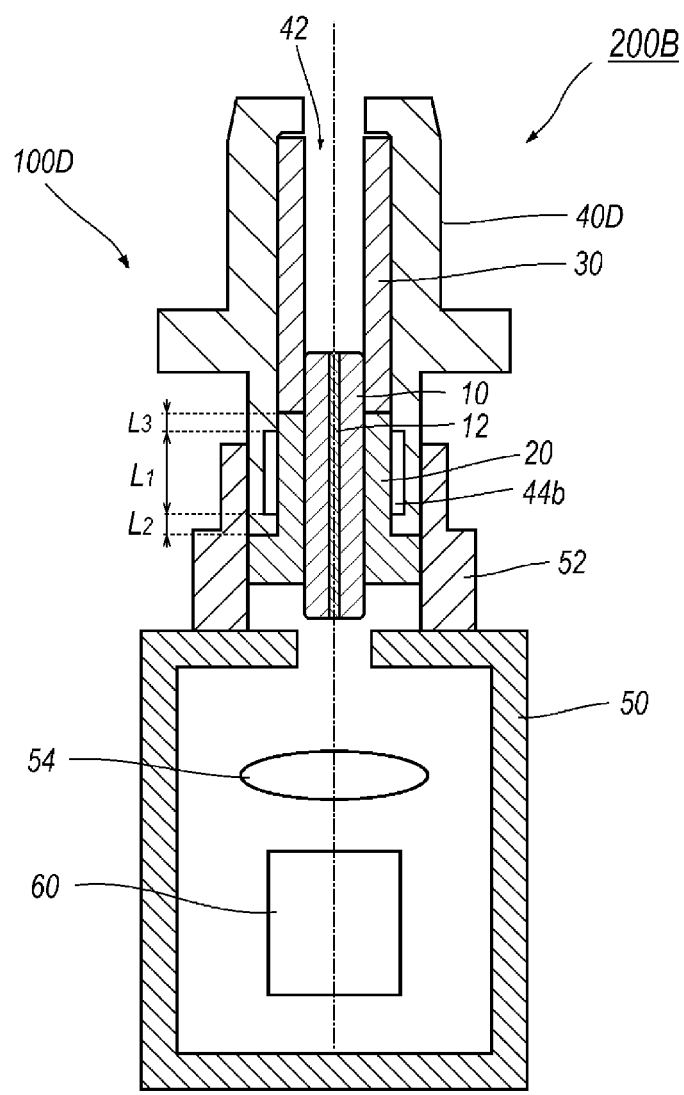

OPTICAL RECEPTACLE RELAXING MECHANICAL STRESS INDUCED BY WELDING AND OPTICAL MODULE IMPLEMENTING THE SAME

TECHNICAL FIELD

The present application relates to an optical receptacle that releases mechanical stresses induced by welding from being affected to a coupling fiber whose optical characteristics are sensitive for stresses. The present application also relates to an optical module that implements such an optical receptacle.

BACKGROUND ART

An optical module that includes a semiconductor optical device usually provides an optical receptacle for optically coupling the semiconductor optical device with an external optical fiber. A Japanese patent application laid open No. JP-H08-334654A has disclosed such an optical module. When an optical receptacle implements a coupling fiber to optically couple the semiconductor optical device with an external fiber to be set within the optical receptacle and the coupling fiber shows stress-sensitive optical characteristics, the optical performance of the optical receptacle, in particular, a polarization maintain function thereof, is often degraded by a stress induced during a process to assemble the optical receptacle with a device that installs the semiconductor optical device or an optical processing device whose performance depends of the polarization of an optical signal incoming through the optical receptacle.

CITATION LIST

Patent Literature

PTL 1: JP-H08-334654A

SUMMARY OF INVENTION

An aspect of the present application relates to an optical receptacle that comprises a cylindrical stub, a cylindrical bush, a sleeve, and a metal cover. The cylindrical stub holds a coupling fiber in a center thereof. The cylindrical bush press-fits the cylindrical stub into a bore thereof. The sleeve receives an end portion of the stub. The metal cover covers the sleeve, the bush, and the stub. A feature of the metal cover and the bush of the present application is that they form a gap therebetween. The gap may relax or absorb stresses induced during the welding of the metal cover to an external metallic member. In particular, when the coupling fiber set in the stub is a type of polarization maintaining fiber (PMF), the gap may relax or reduce the stresses induced by welding metal cover to another metallic member to an amount by which substantially no effect is influenced in the polarization maintaining function of the PMF. The gap may be formed in a side of the metal cover by forming a first bore and a second bore in the metal cover, where the second bore has an inner diameter greater than that of the first bore. The gap may be provided in a side of the bush by forming a first portion and a second portion in the bush, where the first portion has an outer diameter greater than that of the second portion so as to form a co-axial groove in an outer surface of the bush. Or, the gap may be formed in both of the metal cover and the bush.

Another aspect of the present application relates to an optical module. The optical module comprises an optical receptacle, an optical device, and a metal holder. The optical receptacle includes a cylindrical stub, a cylindrical bush, a sleeve and a metal cover. The optical device installs an optical processing device therein. The optical receptacle is aligned and fixed to the optical device through the metal holder by fixing the metal cover to the metal holder, and fixing the metal holder to a housing of the optical device. A feature of the optical module of the embodiment is that the metal cover and the metal bush in the optical receptacle form a gap therebetween, by which stresses induced by the fixation of the metal cover to the metal holder may be absorbed and released. Accordingly, even when the coupling fiber is a type of polarization maintaining fiber (PMF) whose polarization maintaining function is strictly sensitive to a stress possibly induced thereto by the fixation of the metal cover to the metal holder.

BRIEF DESCRIPTION OF DRAWINGS

FIG. 1 schematically illustrates a cross section of an optical receptacle according to the first embodiment of the present invention.

FIG. 2 schematically illustrates a cross section of another optical receptacle comparable to the optical receptacle of the embodiment shown in FIG. 1.

FIG. 3 schematically illustrates a cross section of still another optical receptacle modified from the first embodiment shown in FIG. 1.

FIG. 4 schematically illustrates a cross section of still another optical receptacle modified from the first embodiment shown in FIG. 1.

FIG. 5 schematically illustrates a cross section of an optical module according to the second embodiment of the present invention.

FIGS. 6A to 6D show processes of making the optical receptacle shown in FIG. 1.

FIGS. 7A and 7B show processes of making the optical module shown in FIG. 5.

FIG. 8 schematically illustrates a cross section of another optical module according the third embodiment of the present invention.

FIG. 9 schematically illustrates a cross section of still another optical module according to the fourth embodiment of the present invention.

DESCRIPTION OF EMBODIMENTS

Next, some examples of an optical receptacle and an optical module according to the present application will be described as referring to drawings. In the description of the drawings, numerals or symbols same with or similar to each other will refer to elements same with or similar to each other without duplicated explanations.

(First Embodiment)

FIG. 1 schematically shows a cross section of an optical receptacle according to the first embodiment of the present application. The optical receptacle 100 shown in FIG. 1 includes a stub 10, a bush 20, a sleeve 30, and a cover 40. The stub 10, which has a cylindrical shape with a coupling fiber 12 in a center thereof, may be made of ceramics, typically zirconia oxide (ZrO). The coupling fiber 12 may have a type of, what is called, a polarization maintaining fiber (PMF) that includes stress-inducing regions in respective sides of a core, where the stress-inducing regions causes a stress by which the polarization of an optical signal propagating within the core may be maintained.

The bush 20 provides a first cylinder 22 and a second cylinder 24 continuous to the first cylinder 22, where the first and second cylinders, 22 and 24, having respective ends, 20a and 20b, provide a common bore with an inner diameter same with each other and respective outer diameters different from each other. The first cylinder 22 has a longitudinal length along an axis of the bore longer than a longitudinal length of the second cylinder 24. The stub 10 press-fitted into the bore of the bush 20 extrudes from the respective ends, 20a and 20b, of the bush 20. The bush 20 may be made of alloy including iron (Fe), chromium (Cr), and nickel (Ni), which is often called as austenitic stainless steel.

The sleeve 30, which is also a cylindrical member, has a bore 32, into which the stub 10 in a portion thereof protruding from the one end 20a of the bush 20, is inserted from one side; while, another side of the bore 32 of the sleeve 30 is externally opened. The bore 32 of the sleeve 30 has a diameter substantially equal to or slightly larger than an outer diameter of the stub 10. The sleeve 30 has an outer diameter substantially equal to the outer diameter of the first cylinder 22 of the bush 20. The sleeve 30 may be made of, for instance, zirconia oxide (ZrO).

The cover 40, which is also a cylindrical member, provides a bore 42 with a diameter larger than an outer diameter of the sleeve 30. The bore 42 receives the sleeve 30 and the first cylinder 22 of the bush 20. The first cylinder 22 in a portion thereof is in contact to a surface of the bore 42 of the cover 40; that is, the bush 20 in the portion of the first cylinder 22 is press-fitted between the cover 40 and the stub 10. The second cylinder 24 of the bush 20 is in contact to an end surface 40a of the cover 40. That is, the second cylinder 24 may form a flange with a surface extending from the first cylinder 22 in contact to the end surface 40a of the cover 40. The cover 40 may be also made of alloy of iron (Fe), chromium (Cr), and nickel (Ni), namely, austenitic stainless steel.

A feature of the optical receptacle 100 of the embodiment is that the bore 42 of the cover 40 provides a root portion in a side of the second cylinder 24 of the bush 20, where the root portion has an enlarged inner diameter such that the cover 40 makes a gap 44 against the outer surface of the first cylinder 22 of the bush 20. The gap 44 extends inwardly from the end surface 40a. Thus, the first cylinder 22 in an outer surface thereof provides a portion 21a in contact to the surface of the bore 42 and another portion 21b apart therefrom by the gap 44. The gap 44 may provide a length L1 of 1.5 mm along a longitudinal axis of the stub 10, namely, an optical axis of the optical receptacle 100. On the other hand, the portion 21a may have a length L2 of, for instance, 1.0 mm. The cover 40 in a portion receiving the portion 21a of the bush 20 has a thickness T1 of, for instance, 0.4 mm; while, the cover 40 in another portion forming the gap 44 may have a thickness of, for instance, 0.2 mm. That is, the gap 44 may have a depth of, for instance, 0.2 mm.

The optical receptacle 100 shown in FIG. 1 will be compared with a conventional optical receptacle 500 shown in FIG. 2. FIG. 2 shows a cross section of the conventional optical receptacle 500 comparable to the optical receptacle 100 shown in FIG. 1. The optical receptacle 500, as shown in FIG. 2, has an arrangement different from those of the optical receptacle 100 in a point that no gap is provided between the cover 40 and the first cylinder 22.

Welding the cover 40 of the optical receptacle 500 to a metallic member in order to fix the optical receptacle to the metallic member, a mechanical stress induced by the welding often affects the coupling fiber 12 set in the stub 10. When the coupling fiber 12 is the type of the PMF, the optical performance, in particular, a polarization maintaining function thereof, may be changed.

On the other hand, the optical receptacle 100 of the present embodiment, the gap 44 formed between the cover 40 and the first cylinder 22 effectively absorbs the mechanical stress even the cover 40 is welded to a metallic member. Even when the welding of the cover 40 causes a positional deviation in the cover 40 and the bush 20, which induces mechanical stresses to the bush 20, the stub 10, and the coupling fiber 12; the gap 44 between the inner surface of the bore 42 of the cover 40 and the outer surface of the first cylinder 22 may effectively absorb those stresses, and the coupling fiber 12 may be substantially free from those stresses. The gap 44 may also shorten a length of a portion in contact to the first cylinder 22, which also reduces the stress caused in the bush 20.

The welding of the cover 40 to an external metallic member is preferably carried out in a portion of the cover 40 reflecting the gap 44, which enhances the absorption or the relaxation of the mechanical stresses induced between the cover 40 and the bush 20.

Although the first embodiment provides the gap 44 in the bore 42 of the cover 40; an optical receptacle may provide a gap between the stub 10 and the bush 20. However, such a gap formed closer to the coupling fiber 12 in the center of the stub 10 is resultantly unfavorable in a point to absorb the stresses induced by the welding of the cover 40 to an external metallic member. Because the mechanical stress induced through the welding of the cover 40 may be relaxed by the existence of the gap 44; the coupling fiber 12 set in the center of the stub 10 may be substantially free from the stress, or at least the coupling fiber 12 may be relaxed from the stress. Accordingly, even the coupling fiber has the type of the PMF, the polarization plane thereof may be maintained.

The embodiment shown in FIG. 1 provides the gap 44 in the surface of the bore 42 of the cover 40. However, a position of the gap 44 is not restricted to those arrangements. For instance, a bush 20A in an outer surface of the first cylinder 22 may provide a first cylinder 22A with two diameters different from each other and a second cylinder 24A continuous to a portion of the first cylinder 22A with the smaller diameter, which forms a gap 44A in the first cylinder 22A as shown in FIG. 3; or both of the surface of the bore 42 and the outer surface of a first cylinder 22B of a bush 20B may provide a gap 44B as shown in FIG. 4.

In the arrangement of the gap 44 in the embodiment shown in FIG. 1, a ratio of the thickness of the cover 40 in the portion of the gap 44, which is given by T1-T2 in FIG. 1, against the full thickness T1 of the cover 40 is preferably greater than ¼ but smaller than ⅓ from a balance of toughness of the cover 40 and relaxation of the mechanical stress. The ratio above of around ½ is further preferable. Also, another ratio of the length L1 of the gap 44 along the coupling fiber 12 against a whole overlap length between the cover 40 and the bush 20, namely, L1+L2, is preferably greater than ⅖ but smaller than ⅘ from a balance between tolerance of the press-fitting and the relaxation of the mechanical stress.

(Second Embodiment)

The second embodiment of the present application relates to an optical module that provides an optical receptacle described above and an optical device installing a semiconductor optical device, typically a semiconductor photodiode (PD). FIG. 5 schematically shows a cross section of an optical module 200 of the embodiment. The optical module 200, as shown in FIG. 5, includes the optical receptacle 100 and an optical device 150 that implements an active semiconductor device 60, or an optical processing device, optically coupled with the optical receptacle 100, exactly, optically coupled with the coupling fiber 12 in the optical receptacle 100 through a lens 54. The optical receptacle 100 is fixed to a housing 50 of the optical device 150 through a metal holder 52, which is also a cylindrical member having a bore into which the bush 20 and the cover 40 of the optical receptacle 100 are inserted. The metal holder 52 is welded to the housing 50 of the optical device 150, and the cover 40 of the optical receptacle 100 is also welded, exactly, fillet-welded or piercing-welded to the metal holder 52.

Next, a process of forming the optical receptacle 100, or the optical module 200 will be described as referring to FIGS. 6A to 7B. As shown in FIG. 6A, the stub 10 is first press-fitted into the bush 20, where an outer diameter of the stub 10 is slightly greater than a diameter of the bore 26 of the bush 20, the stub 10 is inserted into the bore 26 by pressing without interposing any glue therebetween. Also, the stub 10 holds no coupling fiber in this step.

Then, the coupling fiber 12 is to be held within the stub 10 as shown in FIG. 6B. Specifically, inserting the coupling fiber 12 into a center bore of the stub 10, and fixing the coupling fiber 12 within the center bore by thermo-curable resin, typically epoxy adhesive. Because the coupling fiber 12 protrudes from respective ends of the stub 10 just after the fixation; cutting the coupling fiber 12 in portions protruding from the ends of the stub 10 and polishing the ends of the stub 10, flush end surfaces of the stub 10 may be formed. Because the coupling fiber 12 is inserted into the stub 10 after the stub 10 is press-fitted into the bush 20; the stress to be caused in the coupling fiber 12 from the stub 10 and the bush 20 may be suppressed, or substantially eliminated compared with a process where the coupling fiber 12 is set in the stub 10 before the press-fitting of the stub 10 into the bush 20.

Next, the sleeve 30 is inserted within the bore 42 of the cover 40, where the cover 40 provides two bores, 42 and 48, where the former bore 42 receives the sleeve 30 as described above and a portion of the first cylinder 22 of the bush 20, while, the latter bore 48 is to form the gap 44 against the first cylinder 22 of the bush 20. Then, as shown in FIG. 6C, one end of the stub 10 is inserted into the bore 32 of the sleeve 30 concurrently with the press-fitting of the first cylinder 22 of the bush 20 into a rest portion of the bore 42 of the cover 40. Because a longitudinal length of the bore 42 of the cover 40 is greater than a longitudinal length of the sleeve 30 along the optical axis thereof, the sleeve 30 may leave the rest portion in the bore 42 into which the end of the first cylinder 22 is press-fitted. Thus, as shown in FIG. 6D, the optical receptacle 100 is completed as providing the gap 44 between the cover 40 and the first cylinder 22 of the bush 20.

Next, subsequent steps for producing the optical module 200 that implements the optical receptacle 100 will be described. First, as shown in FIG. 7A, the housing 50 of the optical module 200 is placed on an alignment stage 92, which is set on a goniometer 94. The goniometer 94, as well known in the field for precisely aligning a member with respect to another member in three-directions of X-, Y-, and Z-, and rolling φ around an X-axis, rolling ψ around a Y-axis, and a rotation around Z-axis, may align the optical processing device 60 in the optical device 150 with the coupling fiber 12, exactly, the tip end of the coupling fiber 12 facing the optical processing device 60. Specifically, holding the metal holder 52 that receives the optical receptacle 100 in a bore thereof and sliding the X- and Y-stages of the goniometer 94, which equivalently slides the metal holder 52 on an outer surface of the housing 50, the optical alignment of the tip end of the coupling fiber 12 in a plane perpendicular to the optical axis thereof may be carried out. As for the Z-alignment, an insertion depth of the optical receptacle 100 into the metal holder 52 is carried out by adjusting the held level of the optical receptacle 100 with respect to the metal holder 52. As for the rolling around the X- and Y-axes, the goniometer may roll or tilt around a point virtually defined above the stage 92. Accordingly, setting the virtual point in the tip end of the coupling fiber 12, and rolling/tilting the goniometer 94, an angle formed between the optical axis of the optical processing device 60, or that of the lens 54, and the optical axis of the coupling fiber 12 may be adjusted. Finally, as for the rotation around Z-axis, the goniometer may rotate the housing 50 with respect to the metal holder 52. After the optical alignment thus described by using the goniometer 94, the optical receptacle 100 is fixed to the metal holder 52 by fillet-welding the cover 40 to an end of the metal holder 52 by the YAG-lasers 96.

The YAG laser welding of two metal members, namely, the cover 40 and the metal holder 52 in the present embodiment, sometimes causes misalignment between the members. Accordingly, the optical alignment between the optical receptacle 100 with the metal holder 52 and the optical processing device 60 may be carried out again by sliding the metal holder 52 on the outer surface of the housing 50. After the second optical alignment, the YAG laser may fix the metal holder 52 to the housing 50 by the fillet-welding. Thus, the optical module 200 that implements the optical receptacle 100 and the optical processing device 60 is completed.

In the description above, the fixation of the cover 40 to the metal holder 52, and that of the metal holder 52 to the housing 50 are carried out by the fillet-welding. However, as for the fixation of the cover 40 to the metal holder 52, another welding technique, namely, the pierce-welding, is applicable Thinning a front portion of the metal holder 52 and performing the pierce-welding may fix the optical receptacle 100 in the cover 40 thereof to the metal holder 52. Also, the optical receptacle 100 of the present invention provides the gap 44 between the cover 40 and the bush 20, the mechanical stress induced by the YAG-laser welding of the cover 40 to the metal holder 52 may be relaxed and the coupling fiber 12, in particular, the coupling fiber with the type of the PMF may become substantially free from the mechanical stresses thus induced and the optical characteristic, namely, the polarization maintaining function thereof may be maintained.

Concurrently with the release of the mechanical stress by the gap 44, a thermal effect induced by the YAG-laser welding may be also relaxed by the existence of the gap 44. That is, the gap 44 where no substance except for air is filled therein, and the air shows the thermal conductivity far less than that of the metals constituting the cover 40 and/or the metal holder 52. Accordingly, heat induced during the YAG-laser welding is hard to be conducted to the coupling fiber 12. The cover 40, which is made of austenite stainless steel, has the thermal conductivity of around 16 W/(mK); while, the air shows the thermal conductivity of 0.024 W/(mK), which is far less than that of the austenite stainless steel.

(Third Embodiment)

FIG. 8 schematically shows a cross section of an optical module according to the third embodiment of the present invention. The optical module 200A of the present embodiment provides an optical receptacle 100C having a gap 44a whose length along the longitudinal axis of the optical receptacle 100C greater than that of the aforementioned gap 44 in the first embodiment. Accordingly, the end of the metal holder 52 overlaps with the gap 44a, which means that the portion of the cover 40, or the metal holder 52 to be welded to each other is overlapped with the gap 44a. The longitudinal length L1 of the gap 44a of the present arrangement is about 2.0 mm, while, another longitudinal length L2 by which the first cylinder 22 of the bush 20 is in contact to the cover 40 is about 0.5 mm. Thus, the arrangement of the gap 44a, exactly, the arrangement of a cover 40A and the metal holder 52, may further relax the mechanical stress applied to the coupling fiber 12.

(Fourth Embodiment)

FIG. 9 schematically illustrates a cross section of still another optical module according to the fourth embodiment of the present application. The optical module 200B of the present embodiment provides an optical receptacle 100D having a gap 44b between a cover 40D and the first cylinder 22 of the bush 20. A feature of the gap 44b of the present embodiment are those the gap 44b covers the portion of the cover 40D, or the metal holder 52, to be welded with each other, and the cover 40D in the end portion thereof facing the second cylinder 24 of the bush 20 is in contact to the bush 20. In the optical receptacle 100C of the previous embodiment shown in FIG. 8, the gap 44a extends to the end of the cover 40, which resultantly shortens the overlap length between the cover 40 and the bush 20, and weakens the holding force of the bush 20 by the cover 40. The optical receptacle 100D of the present embodiment provides the cover 40D whose end is in contact to the bush 20, which enhances the holding force of the bush 20 by the cover 40D compared to the arrangement of the previous optical receptacle 100C. The gap 44b of the present embodiment has a longitudinal length L1 of about 1.5 mm along the longitudinal axis of the bush 20, the overlapping lengths, L2 and L3, between the cover 40 and the bush 20 in the end portion of the cover 40D and the end portion of the bush 20, respectively, are 0.5 mm. Thus, the gap 44b makes two subjects consistent, one is to relax the mechanical stress induced by the welding form being affected to the coupling fiber 12 and the other is to maintain the holding force of the bush 20 by the cover 40D.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An optical module, comprising:
   an optical receptacle having an optical axis thereof and including,
   a cylindrical stub that holds a coupling fiber in a center thereof, the cylindrical stub having an end portion,
   a cylindrical bush fitting having a bore that press-fits the cylindrical stub therein;
   a sleeve that receives the end portion of the cylindrical stub; and
   a metal cover that covers the sleeve, the cylindrical bush, and the cylindrical stub, where the metal cover forms a gap against the cylindrical bush;
   an optical device that includes an optical processing device and a housing, the optical processing device processing an optical signal entering through the optical receptacle, the housing enclosing the optical processing device therein; and
   a metal holder that fixes the optical receptacle to the housing of the optical device,
   wherein the gap between the metal cover and the cylindrical bush overlaps with an end of the metal holder in a side opposite to the optical device.

2. The optical module of claim 1,
   wherein the cylindrical bush has an end portion and a rest portion along the optical axis of the optical receptacle,
   wherein the metal cover provides a first bore and a second bore along the optical axis, the first bore receiving the sleeve and the end portion of the cylindrical bush, the second bore receiving the rest portion of the cylindrical bush, the second bore having an inner diameter greater than an inner diameter of the first bore, and
   wherein the gap is provided between the second bore of the metal cover and the rest portion of the cylindrical bush.

3. The optical module of claim 1,
   wherein the cylindrical bush has a first portion and a second portion along the optical axis, the first portion having an outer diameter greater than an outer diameter of the second portion,
   wherein the metal cover has a bore with an even inner diameter, and
   wherein the gap is provided between the second portion of the cylindrical bush and the metal cover.

4. The optical module of claim 1,
   wherein the cylindrical bush has an end portion and a rest portion along the optical axis, the end portion having an outer diameter greater than an outer diameter of the rest portion,
   wherein the metal cover provides a first bore and a second bore along the optical axis, the first bore receiving the sleeve and the end portion of the cylindrical bush, the second bore receiving the rest portion of the cylindrical bush, the second bore having an inner diameter greater than an inner diameter of the first bore, and
   wherein the gap is provided between the second bore of the metal cover and the rest portion of the cylindrical bush.

5. The optical module of claim 1,
   wherein the cylindrical bush provides a first cylinder and a second cylinder, the first cylinder being set within a bore of the metal cover, the second cylinder having an outer diameter greater than an outer diameter of the first cylinder,
   wherein the sleeve has an outer diameter substantially equal to the outer diameter of the first cylinder of the cylindrical bush, and
   wherein the metal cover provides a bore that receives the sleeve and the first cylinder of the cylindrical bush, the bore of the metal cover having an inner diameter slightly greater than the outer diameter of the sleeve.

6. The optical module of claim 5,
   wherein the second cylinder of the cylindrical bush has an outer diameter substantially equal to an outer diameter of the metal cover, and the metal holder provides a bore into which the metal cover and the second cylinder of the cylindrical bush are inserted, the bore of the metal holder having an inner diameter slightly greater than the outer diameter of the second cylinder of the cylindrical bush and the outer diameter of the metal cover.

7. The optical module of claim 1,
   wherein the coupling fiber is a type of a polarization maintaining fiber (PMF).

8. The optical module of claim 1,
wherein the metal cover and the metal holder are made of austenite stainless steel.

9. An optical receptacle that provides an optical axis, comprising:
a cylindrical stub that holds a coupling fiber in a center thereof;
a cylindrical bush having a bore where the cylindrical stub is press-fitted therein, the cylindrical bush includes a flange and a cylinder along the optical axis, the cylinder having an end portion and a rest portion that is continuous to the flange thereof;
a sleeve that receives an end portion of the cylindrical stub; and
a metal cover that covers the sleeve, the cylindrical bush, and the cylindrical stub, the metal cover having a first portion and a second portion along the optical axis, the first portion being sandwiched between the flange of the cylindrical bush and the second portion of the metal cover,
wherein the cylindrical bush in the cylinder thereof is press-fitted between the cylindrical stub and the metal cover, and
wherein the first portion of the metal cover and the rest portion of the cylinder of the cylindrical bush radially form a gap therebetween.

10. The optical receptacle of claim 9,
wherein the cylinder of the cylindrical bush has an even outer diameter, and
wherein the metal cover has a first bore in the first portion and a second bore in the second portion, the first bore having an inner diameter greater than an inner diameter of the second bore, the second bore in the second portion of the metal cover being in contact with the end portion of the cylindrical bush.

11. The optical receptacle of claim 9,
wherein the metal cover has a bore with an even inner diameter in the first portion and the second portion thereof, and
wherein the end portion of the cylindrical bush has an outer diameter greater than an outer diameter of the rest portion of the cylindrical bush, the end portion of the cylindrical bush being in contact with the bore of the metal cover.

12. The optical receptacle of claim 9,
wherein the metal cover has a first bore in the first portion and a second bore in the second portion, the first bore having an inner diameter greater than an inner diameter of the second bore,
wherein the end portion of the cylindrical bush has an outer diameter greater than an outer diameter of the rest portion of the cylindrical bush, and
wherein the end portion of the cylindrical bush is in contact with the second bore of the metal cover.

13. The optical receptacle of claim 9,
wherein the end portion of the cylindrical bush has an outer diameter,
wherein the sleeve has an outer diameter substantially equal to the outer diameter of the end portion of the cylindrical bush, and
wherein the second portion of the metal cover provides a bore that receives the sleeve and the cylinder of the cylindrical bush.

14. The optical receptacle of claim 13,
wherein the first portion of the metal cover is in contact with the flange of the cylindrical bush.

15. The optical receptacle of claim 13
wherein the metal cover has an outer diameter substantially equal to an outer diameter of the flange of the cylindrical bush.

16. The optical receptacle of claim 9,
wherein the sleeve provides a bore into which an end portion of the cylindrical stub is inserted, the end portion of the cylindrical stub protruding in the bore of the sleeve, and
wherein the cylindrical stub further provides another end portion opposite to the end portion thereof, the another end portion of the cylindrical stub protruding from the flange of the cylindrical bush.

17. The optical receptacle of claim 9,
wherein the coupling fiber is a type of a polarization maintaining fiber (PMF).

18. The optical receptacle of claim 9,
wherein the metal cover is made of austenite stainless steel.

* * * * *